United States Patent [19]

Kitamura et al.

[11] 4,250,660

[45] Feb. 17, 1981

[54] PROCESS FOR PRODUCING COATED SEED

[75] Inventors: Shuji Kitamura; Masashi Watanabe, both of Ibaraki; Michihiro Nakayama, Osaka, all of Japan

[73] Assignee: Sumitomo Chemical Company, Limited, Osaka, Japan

[21] Appl. No.: 50,334

[22] Filed: Jun. 20, 1979

[30] Foreign Application Priority Data

Jul. 12, 1978 [JP] Japan .................................. 53-85391

[51] Int. Cl.³ .............................................. A01C 1/06
[52] U.S. Cl. ................................ 47/57.6; 47/DIG. 9; 47/58
[58] Field of Search ................ 47/58, 57.6, DIG. 9; 428/403; 427/4, 212, 215, 220–221

[56] References Cited

U.S. PATENT DOCUMENTS

| | | | |
|---|---|---|---|
| 2,579,735 | 12/1951 | Burgesser | 47/57.6 |
| 2,656,649 | 10/1953 | Ostier | 47/57.6 |
| 2,967,376 | 1/1961 | Scott | 47/57.6 |
| 3,703,404 | 11/1972 | Kirk | 47/57.6 X |
| 3,950,891 | 4/1976 | Hinkes | 47/57.6 |
| 4,067,141 | 1/1978 | Matsunaga | 47/57.6 |

*Primary Examiner*—Robert E. Bagwill
*Attorney, Agent, or Firm*—Stevens, Davis, Miller & Mosher

[57] ABSTRACT

Coated seeds, the coating of which has sufficient hardness for machine-seeding and adequate disintegration characteristics in soil, are obtained by surface treating a coating powder and then coating seeds with the surface-treated coating powder.

12 Claims, No Drawings

PROCESS FOR PRODUCING COATED SEED

The present invention relates to the preparation of coated seeds. Hitherto, increasing the bulk of seeds by coating them with an inorganic substance has been carried out for ease of mechanical sowing and handling, and for long-term storage. Specifically, there have been employed processes in which seeds are coated, on a coating machine, with a powder material (e.g. diatomaceous earth, calcium carbonate, talc, silica, kaolin-clay, zeolite, bentonite, vermiculite) through a water-soluble binder [e.g. starch, polyvinyl alcohol (PVA), carboxymethyl cellulose (CMC), methyl cellulose (MC), gelatin].

When such well-known processes are, however, applied to the coating of fine seeds such as flower seeds, it is common that only coated seeds having not only nonuniform particle size but also soft coating layer are obtained. Consequently, there are troubles such as breaking of coating layers on mechanical sowing, automatic filling or transportation.

Further, coated seeds should be easy to disintegrate by moisture in soil.

As a result of extensive study to solve the foregoing problems, the inventors found that coated seeds having a narrow particle size distribution and moderate hardness can be produced by coating seeds with a coating powder previously surface-treated with a water-soluble binder.

The present invention provides a process for producing a coated seed, which comprises treating the surface of a coating powder with a water-soluble binder, and then coating a seed using the surface-treated coating powder, and provides a coated seed comprising a seed and a coating thereon of a coating powder, said coating powder having been surface-treated with a water-soluble binder and being bonded by a water-soluble binder to said seed to form a coating thereon.

The water-soluble binders used in the present invention include starch, PVA, CMC, MC, gelatin, pullulan and the like. The amount of the binder used is 0.1 to 20% by weight, preferably 0.5 to 5% by weight, based on the weight of the coating powder.

The coating powders used in the present invention include, for example, diatomaceous earth, aluminum hydroxide, calcium hydroxide, magnesium hydroxide, barium hydroxide, calcium sulfate, calcium sulfite, basic magnesium carbonate, kaolin-clay, dolomite, talc, zeolite, illite, halloysite, bentonite, vermiculite, microlite, peat moss and the like. These powders may be used alone or in combination. Of these, diatomaceous earth, kaolin-clay, dolomite, talc and bentonite are particularly preferred. The mean particle size of these powders is preferably $10\mu$ or less, particularly preferably $1\mu$ or less.

As is well-known to the skilled in the art, additives such as growth hormone compounds, fungicides and colouring agents may be added to these powders.

In carrying out the process of the present invention, for example, an aqueous solution of the water-soluble binder is mixed thoroughly with the coating powder, and the mixture is dried by heating to obtain a solid substance. The concentration of the aqueous solution is not particularly limited, but generally it is preferably 0.1 to 10% by weight. The solid substance obtained is powdered to a mean particle size of preferably $10\mu$ or less, particularly preferably $1\mu$ or less, and then used for coating seeds. In carrying out this surface treatment on an industrial scale, methods of treating a slurry comprising the powder, binder and water by a spray-drier, or methods using a Henschel mixer or kneader are properly selected.

In order to display the characteristics of the present invention sufficiently, the surface of the coating powder is uniformly treated with the water-soluble binder. For this purpose, the concentration and amount of the aqueous solution of the water-soluble binder are properly varied depending upon the particle size, surface state and shape of the coating powder.

The coating powder thus surface-treated is applied to the coating of seeds by the usual ways. The coating machines used in the present invention include for example sugar-coating machines, centrifugal fluidizing coating machines, fluidized bed coating machines and the like.

Of course, the process of the present invention may also be applied to the coating of seeds of different shapes.

The coated seeds obtained by the present invention have the following characteristics: (1) They are easy in handling and helpful in saving the amount of seeds by mechanical sowing, shortening sowing time and saving labour for thinning; (2) the shelf life of the coated seeds can be prolonged by properly controlling the moisture content and the thickness of the coating layer; (3) coated seeds having a higher surface hardness can be obtained with less amount of the water-soluble binder because the binder displays a larger effect than in the conventional coating processes; (4) and the coating layer easily disintegrates after sowing by the action of moisture in soil with no effect on germination and growth like in the sowing of uncoated seeds.

The present invention will be illustrated in more detail with reference to the following examples, which are only given for the purpose of illustration and not to be interpreted as limiting the invention thereto.

EXAMPLE 1

(1) Surface treatment of diatomaceous earth

Diatomaceous earth (250 g) and an aqueous solution (250 cc) containing 2% by weight of CMC (Cellogen 6A, produced by Daiichi Kōgyō Seiyaku Co.) were together kneaded into paste. The paste was then dried at 105° C. for 3 hours in a hot-air drier, powdered to a mean particle size of $5\mu$ by a pulverizer to obtain a coating material of the surface-treated diatomaceous earth.

(2) Coating

The seeds of petunia (6 g) were placed in a sugar-coating pan and tumbled with the above surface-treated diatomaceous earth (250 g) by the alternate addition of the diatomaceous earth, while an aqueous solution (250 cc) containing 1% by weight of CMC was sprayed thereon (spraying pressure, 0.5 kg/cm$^2$; spray nozzle, 0.2 mm$\phi$). The tumbling was stopped when the size of the seeds reached about 3 times as large as the initial size. The coated seeds were withdrawn from the pan and dried at 35° C. for 15 hours in a hot-air drier to obtain a product. The results obtained are shown in Table 1.

EXAMPLE 2

(1) Surface treatment of kaolin-clay

Kaolin-clay (250 g) and an aqueous solution (250 cc) containing 1% by weight of pullulan (mean molecular weight, 100,000) were together kneaded into paste. The paste was then dried at 105° C. for 3 hours in a hot-air drier, powdered to a mean particle size of 5μ by a pulverizer to obtain a coating material of the surface-treated kaolin-clay.

(2) Coating

The seeds of petunia (6 g) were placed in a sugar-coating pan and tumbled with the above surface-treated kaolin-clay (250 g) by the alternate addition of the kaolin-clay, while an aqueous solution (250 cc) containing 1% by weight of pullulan was sprayed thereon (spraying pressure, 0.4 kg/cm²; spray nozzle, 0.2 mmφ). The tumbling was stopped when the size of seeds reached about 3 times as large as the initial size. The coated seeds were withdrawn from the pan and dried at 35° C. for 15 hours in a hot-air drier to obtain a product. The results obtained are shown in Table 1.

Comparative example 1

Coating was carried out in the same manner as in Example 1 except that the seeds were coated with untreated diatomaceous earth (250 g) while spraying an aqueous solution (250 cc) containing 3% by weight of CMC (Cellogen 6 A, produced by Daiichi Kōgyō Seiyaku Co.) (spraying pressure, 0.7 kg/cm²; spray nozzle, 0.2 mmφ). The results obtained are shown in Table 1.

Comparative example 2

Coating was carried out in the same manner as in Example 1 except that the seeds were coated with untreated diatomaceous earth (250 g) while spraying an aqueous solution (250 cc) containing 5% by weight of CMC (Cellogen 6 A, produced by Daiichi Kōgyō Seiyaku Co.) (spraying pressure, 1.0 kg/cm²; spray nozzle, 0.2 mmφ). The results obtained are shown in Table 1.

Comparative example 3

Coating was carried out in the same manner as in Example 2 except that the seeds were coated with untreated kaolin-clay (250 g) while spraying an aqueous solution (250 cc) containing 2% by weight of pullulan (mean molecular weight, 100,000) (spraying pressure, 0.5 kg/cm²; spray nozzle, 0.2 mmφ). The results obtained are shown in Table 1.

Comparative example 4

Coating was carried out in the same manner as in Example 2 except that the seeds were coated with untreated kaolin-clay (250 g) while spraying an aqueous solution (250 cc) containing 4% by weight of pullulan (mean molecular weight, 100,000) (spraying pressure, 0.6 kg/cm²; spray nozzle, 0.2 mmφ). The results obtained are shown in Table 1.

The coated petunia seeds obtained by the present invention were very good in germination with the same rate of germination as with uncoated petunia seeds. Also, difference in growth was not observed.

TABLE 1

| Example | Water-soluble binder | | Powder material | | Particle size of coated seeds | | Surface hardness of coated seeds *1 | Disintegration in water *2 |
|---|---|---|---|---|---|---|---|---|
| | Concentration of aqueous binder solution (weight %) | Amount (cc) | Surface treatment | Condition of surface treatment | Particle size (mmφ) | Rate (%) | | |
| Example 1 | CMC 1 | 250 | Applied | Diatomaceous earth (250 g) was treated with an aqueous 2% by weight CMC solution (250 cc) | <2.0<br>2.0 ~ 2.5<br>>2.5 | 2<br>98<br>0 | Good | Good |
| Example 2 | Pullulan 1 | 250 | Applied | Kaolin-clay (250 g) was treated with an aqueous 1% by weight pullulan solution (250 cc) | <2.0<br>2.0 ~ 2.5<br>>2.5 | 0<br>99<br>1 | Good | Good |
| Comparative example 1 | CMC 3 | 250 | Not applied | — | <2.0<br>2.0 ~ 2.5<br>>2.5 | 24<br>66<br>10 | Poor | Slightly poor |
| Comparative example 2 | CMC 5 | 250 | Not applied | — | <2.0<br>2.0 ~ 2.5<br>>2.5 | 15<br>45<br>40 | Good | Poor |
| Comparative example 3 | Pullulan 2 | 250 | Not applied | — | <2.0<br>2.0 ~ 2.5<br>>2.5 | 10<br>75<br>15 | Slightly poor | Good |
| Comparative example 4 | Pullulan 4 | 250 | Not applied | — | <2.0<br>2.0 ~ 2.5<br>>2.5 | 7<br>55<br>38 | Good | Slightly poor |

*1: Surface hardness of coated seeds: Evaluated from the ease of breaking by nail. Difficult breaking was taken as "good".
*2: Disintegration in water: Evaluated from the ease of collapse of the coating layer in water. Disintegration was taken as "good".

What is claimed is:

1. A process for producing a coated seed, which comprises mixing a coating powder with an aqueous solution of a water-soluble binder, drying the resulting mixture, powdering the mixture, and then coating a seed using the resulting surface-treated coating powder.

2. A process according to claim 1, wherein the coating powder is one member selected from diatomaceous earth, aluminum hydroxide, calcium hydroxide, magnesium hydroxide, barium hydroxide, calcium sulfate, calcium sulfite, basic magnesium carbonate, kaolin-clay, dolomite, talc, zeolite, illite, halloysite, bentonite, vermiculite, microlite and peat moss.

3. A process according to claim 1, wherein the water-soluble binder is one member selected from starch, polyvinyl alcohol, carboxymethyl cellulose, methyl cellulose, gelatin and pullulan.

4. A process according to claim 1, wherein the amount of the water-soluble binder is 0.1 to 20% by weight based on the weight of the coating powder.

5. A process according to claim 1, wherein the aqueous solution of the water-soluble binder is in a concentration of 0.1 to 10% by weight.

6. A process according to claim 1, wherein the powdering is carried out so as to make a mean particle size of the mixture 10μ or less.

7. A process according to claim 1, wherein the coating is carried out using a water-soluble binder.

8. A coated seed obtained by the process of claim 1.

9. A coated seed comprising a seed and a coating thereon of a coating powder, said coating powder having been previously treated by mixing the powder with an aqueous solution of a water-soluble binder, drying the resulting mixture and powdering the mixture, said resulting treated coating powder being bonded by a water-soluble binder to said seed to form a coating thereon.

10. A coated seed according to claim 9, wherein the coating powder is one member selected from diatomaceous earth, aluminum hydroxide, calcium hydroxide, magnesium hydroxide, barium hydroxide, calcium sulfate, calcium sulfite, basic magnesium carbonate, kaolin-clay, dolomite, talc, zeolite, illite, halocite, bentonite, vermiculite, microcite and peat moss.

11. A coated seed according to claim 9, wherein the water-soluble binder is one member selected from starch, polyvinyl alcohol, carboxymethyl cellulose, methyl cellulose, gelatin and pullulan.

12. A coated seed according to claim 9, wherein the amount of the water-soluble binder is 0.1 to 20% by weight based on the weight of the coating powder.

* * * * *